United States Patent
Cai

(10) Patent No.: US 10,757,037 B2
(45) Date of Patent: Aug. 25, 2020

(54) METHOD AND SYSTEM FOR DYNAMIC SCHEDULING AND ALLOCATION OF NETWORK TRAFFIC

(71) Applicant: WANGSU SCIENCE & TECHNOLOGY CO., LTD., Shanghai (CN)

(72) Inventor: Zhenhe Cai, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 31 days.

(21) Appl. No.: 16/321,870

(22) PCT Filed: Jun. 1, 2017

(86) PCT No.: PCT/CN2017/086805
§ 371 (c)(1),
(2) Date: Jan. 30, 2019

(87) PCT Pub. No.: WO2018/209734
PCT Pub. Date: Nov. 22, 2018

(65) Prior Publication Data
US 2020/0186479 A1   Jun. 11, 2020

(30) Foreign Application Priority Data
May 15, 2017 (CN) .......................... 2017 1 0337462

(51) Int. Cl.
*G06F 15/173* (2006.01)
*H04L 12/917* (2013.01)
(Continued)

(52) U.S. Cl.
CPC ............ *H04L 47/76* (2013.01); *H04L 47/821* (2013.01); *H04L 61/1511* (2013.01); *H04L 61/2007* (2013.01)

(58) Field of Classification Search
None
See application file for complete search history.

(56) References Cited

U.S. PATENT DOCUMENTS 10,091,057 B2 * 10/2018 Haswell .............. H04L 41/0806
10,601,704 B2 *  3/2020 Shah ................... H04L 12/4633
(Continued)

FOREIGN PATENT DOCUMENTS

CN    101764747 A    6/2010
CN    102055818 A    5/2011
(Continued)

OTHER PUBLICATIONS

The World Intellectual Property Organization (WIPO) International Search Report for PCT/CN2017/086805 dated Jan. 25, 2018 5 Pages.
(Continued)

*Primary Examiner* — Phuoc H Nguyen
(74) *Attorney, Agent, or Firm* — Anova Law Group, PLLC

(57) ABSTRACT

A method and system for dynamic scheduling and allocation of network traffic are provided. The method includes: distributing, by a central scheduling system, a domain name initial configuration table and a determination strategy to each detection node; detecting, by each detection node, each server node of a pre-set domain name in the domain name initial configuration table, thereby obtaining performance information of each server node; generating, by each detection node, a corresponding best coverage record; and converting, by the central scheduling system, the best coverage record into a target server node and feeding back, by the central scheduling system, the target server node to a local DNS server. The disclosed method and system for dynamic scheduling and allocation of network traffic improves network access speed and reduces operation and maintenance cost.

17 Claims, 3 Drawing Sheets

(51) Int. Cl.
*H04L 29/12* (2006.01)
*H04L 12/911* (2013.01)

(56) References Cited

U.S. PATENT DOCUMENTS

| | | |
|---|---|---|
| 2003/0079027 A1 | 4/2003 | Slocombe et al. |
| 2006/0112176 A1 | 5/2006 | Liu et al. |
| 2013/0290466 A1 | 10/2013 | Lee et al. |
| 2016/0080502 A1* | 3/2016 | Yadav .................. G06F 16/285 709/227 |

FOREIGN PATENT DOCUMENTS

| | | |
|---|---|---|
| CN | 102136969 A | 7/2011 |
| CN | 102148752 A | 8/2011 |
| WO | 2010057192 A1 | 5/2010 |

OTHER PUBLICATIONS

The European Patent Office (EPO) The Extended European Search Report for 17909729.0 dated Nov. 11, 2019 8 Pages.

* cited by examiner

METHOD AND SYSTEM FOR DYNAMIC SCHEDULING AND ALLOCATION OF NETWORK TRAFFIC

CROSS-REFERENCES TO RELATED APPLICATIONS

This application is a national phase entry under 35 U.S.C. § 371 of International Application No. PCT/CN2017/086805 filed on Jun. 1, 2017, which claims priority of Chinese Patent Application No. 201710337462.6, filed on May 15, 2017, the entire content of all of which are incorporated herein by reference.

FIELD OF THE DISCLOSURE

The present disclosure generally relates to the Internet technology and, more particularly, relates to a method and system for dynamic scheduling and allocation of network traffic.

BACKGROUND

Since the birth of the Internet, the Internet application providers have been pursuing to provide faster and more convenient service experience for users. In such process, many technologies have been developed, such as domain name system (DNS), and content distribute network (CDN), etc.

DNS is configured to name computers and network services that are organized into a hierarchy of domains, and is the most important infrastructure service system of the Internet. The appearance of DNS may allow users to access the Internet more conveniently without remembering the IP strings that can be directly read by a machine. The conversion between the domain names and the IP strings is called domain name resolution, and the host computer that executes such function is called a DNS server. When a user inputs a domain name into an application program, the DNS service may resolve the domain name into other related information corresponding to the domain name, such as the IP address, thereby fulfilling the access to the website.

Based on the DNS system, a plurality of service systems are derived to improve the Internet access speed, such as various traffic scheduling systems. One of the most well-known traffic scheduling and allocating system is the content distribution network (CDN).

The primary task of CDN is to transmit content from source servers to clients as quickly as possible. The CDN technology is an effective approach that first emerges and rapidly develops in the United States in recent years for solving the issues of poor Internet performance and excessive delay in content delivery. The principle idea of CDN is to avoid bottlenecks and steps over the Internet that may affect the speed and stability of data transmission, thereby allowing the content transmission to be faster and better. Through the content distribute network constituted by edge node servers placed all over the Internet, the user access request may be re-directed to the best edge node that is the nearest to the users in real-time based on comprehensive information such as the network traffic, the load condition of each edge node, the distance from the edge node to the user, and the response time, etc. By adding a global scheduling layer to the existing network architecture, the system may distribute the source server content to the network edge nearest to the user. Thus, the user may obtain the desired content as nearest as possible, the situation of Internet congestion may be overcome, and the response speed of the website accessed by the user may be improved. Accordingly, the issue of slow response speed of the website accessed by the user that is caused by the small egress bandwidth of the source server, a large amount of user access, uneven distribution of the network nodes, the complex service provider network, and the small ingress bandwidth of user access network may be solved.

The existing scheduling systems often rely on the static strategies, i.e., via a plurality of DNS mapping tables. Through such DNS mapping tables, different domain name coverage regions may be differentiated, and the access traffic may be directed to different nodes based on the DNS mapping tables. Though such solution may solve a great amount of website traffic allocating issues, the following drawbacks still exist.

1. The static strategies based the DNS mapping table cost a lot of manpower for maintenance and adjustments, and the adjustments may not be timely enough.

2. The strategies may be too fixed, and are strictly divided based on the regional service provider, such that user may not access the best node.

3. The standard of constructing the accurate strategies is high, which may be gradually realized by technicians with rich experience after continuous long-term optimization.

BRIEF SUMMARY OF THE DISCLOSURE

To solve issues in the existing technology, the present disclosure provides a method and system for dynamic scheduling and allocation of network traffic. The technical solutions are as follows.

In one aspect, the present disclosure provides a method for dynamic scheduling and allocation of network traffic, and the method includes:

distributing, by a central scheduling system, a domain name initial configuration table and a determination strategy to each detection node;

detecting, by each detection node, each server node of the pre-set domain name in the domain name initial configuration table, thereby obtaining performance information of each server node;

generating, by each detection node, a corresponding best coverage record based on the determination strategy and the obtained performance information, and uploading, by each detection node, the best coverage record to the central scheduling system; and converting, by the central scheduling system, the best coverage record into a target server node and feeding back, by the central scheduling system, the target server node to a local DNS server.

Further, the determination strategy includes the number of server nodes corresponding to each detection node, whether network access across internet service operators is allowed, the detection time interval, the expected bandwidth utilization rate of the server nodes, and the expected response time of the server nodes; and the performance information of each server node includes actual response time, actual availability, and an actual bandwidth utilization rate of each server node.

Further, generating, by each detection node, a corresponding best coverage record based on the determination strategy and the obtained performance information specifically includes:

based on an IP address of each detection node, obtaining a geographical location and an internet service operator of each detection node;

based on the expected bandwidth utilization rate, the expected response time of the server node, and the performance information of the server node, calculating, by the detection node, a priority corresponding to each server node;

sorting server nodes based on an order of the priority from high to low;

when the determination strategy allows network access across internet service operators, filtering out top N server nodes from the sorted server nodes, and determining the top N server nodes as best coverage nodes corresponding to the detection node, where N is the number of server nodes corresponding to each detection node in the determination strategy; and establishing, by each detection node, the corresponding best coverage record, where the best coverage record includes the pre-set domain name, the geographical location of the detection node, the internet service operator of the detection node, and the top N server nodes.

Further, the following equation is used to calculate the priority corresponding to each server node:

$$P_i=(T_s/T_i)*A_i*(B_s/B_i),$$

where, $P_i$ denotes a priority corresponding to an i-th server node, $T_s$ denotes an expected response time of the server node in the determination strategy, $T_i$ denotes an actual response time of the i-th server node, $A_i$ denotes an actual availability of the i-th server node, when the i-th server node is available, $A_i$ is 1; when the i-th server node is unavailable, $A_i$ is 0, $B_s$ denotes an expected bandwidth utilization rate of the server node in the determination strategy, and $B_i$ denotes an actual bandwidth utilization rate of the i-th server node.

Further, the method further includes:

when the determination strategy does not allow network access across internet service operators, removing the server nodes from sorted server nodes different from the internet service operator of the detection node; and filtering out first N server nodes from the remaining server nodes, and determining the top N server nodes as the best coverage nodes corresponding to the detection node, where N is the number of server nodes corresponding to each detection node in the determination strategy.

Further, the method includes determining an address of the target server node corresponding to a domain name resolution request based on a domain name resolution record specifically by:

obtaining, by a pre-set DNS server, an IP address of the local DNS server from the domain name resolution request;

determining, by the pre-set DNS server, the geographic location and the internet service operator of the local DNS server based on the IP address of the local DNS server; and querying, by the pre-set DNS server, a target record that matches the geographic location and the internet service operator of the local DNS server from the domain name resolution record, and using the IP address in the target record as the address of the target server node.

Further, after uploading, by each detection node, the best coverage record to the central scheduling system, the method further includes:

obtaining once again, by each detection node, the performance information of each server node according to the detection time interval in the determination strategy; and re-generating, by each detection node, a corresponding best coverage record based on the once again obtained performance information and the determination strategy, and uploading, by each detection node, the re-generated best coverage record to the central scheduling system.

Further, generating, by each detection node, the corresponding best coverage record, and uploading, by each detection node, the best coverage record to the central scheduling system further includes: refreshing, by the central scheduling system, the initial configuration table based on the best coverage record, and recognizing, by the central scheduling system, the target server node based on the refreshed configuration table.

Further, converting, by the central scheduling system, the best coverage record into a target server node and feeding back, by the central scheduling system, the target server node to a local DNS server includes:

converting, by the central scheduling system, each best coverage record into a domain name resolution record, and pushing the domain name resolution record to the pre-set DNS server; and receiving, by the pre-set DNS server, the domain name resolution request sent from the local DNS server, determining, by the pre-set DNS server, the address of the target server node corresponding to the domain name resolution request based on the domain name resolution record, and feeding back, by the pre-set DNS server, the address of the target server node to the local DNS server.

In another aspect, the present disclosure provides a system for dynamic scheduling and allocation of network traffic. The system includes a central scheduling system, at least one detection node, and a pre-set DNS server, where:

the central scheduling system is configured to distribute a domain name initial configuration table and a determination strategy to each detection node and receive a best coverage record uploaded by each detection node; convert each best coverage record into a domain name resolution record, and push the domain name resolution record to the pre-set DNS server;

each detection node is configured to, with respect to the pre-set domain name in the domain name initial configuration table, initiate detection on each server node of the pre-set domain name, thereby obtaining the performance information of each server node; generate a corresponding best coverage record based on the determination strategy and the obtained performance information, and upload the best coverage record to the central scheduling system; and the pre-set DNS server is configured to receive a domain name resolution request sent from the local DNS server, determine an address of the target server node corresponding to the domain name resolution request based on the domain name resolution record, and feedback the address of the target server node to the local DNS server.

Further, the determination strategy includes the number of server nodes corresponding to each detection node, whether network access across internet service operators is allowed, the detection time interval, the expected bandwidth utilization rate of the server nodes, and the expected response time of the server nodes; and the performance information of each server node includes actual response time, actual availability, and an actual bandwidth utilization rate of each server node.

Further, each detection node includes:

a location information acquisition unit, configured to acquire a geographic location and an internet service operator of each detection node based on a corresponding IP address;

a priority calculation unit, configured to calculate priority corresponding to each server node based on the expected bandwidth utilization rate of the server node, the expected response time of the server node, and the performance information of the server node;

a sorting unit, configured to sort server nodes based on an order of the priority from high to low;

a server node filtering unit configured to, when the determination strategy allows network access across internet service operators, filter out top N server nodes from the sorted server nodes and determine the top N server nodes as the best coverage nodes, where N is the number of server nodes corresponding to each detection node in the determination strategy; and a coverage record establishment unit, configured to establish a best coverage record, where the best coverage record includes a pre-set domain name, a geographic location and an internet service operator of the detection node, and N server nodes.

Further, the following equation is used to calculate the priority corresponding to each server node:

$$P_i=(T_s/T_i)*A_i*(B_s/B_i),$$

where, $P_i$ denotes a priority corresponding to an i-th server node, $T_s$ denotes an expected response time of the server node in the determination strategy, $T_i$ denotes an actual response time of the i-th server node, $A_i$ denotes an actual availability of the i-th server node, when the i-th server node is available, $A_i$ is 1; when the i-th server node is unavailable, $A_i$ is 0, $B_s$ denotes an expected bandwidth utilization rate of the server node in the determination strategy, and $B_i$ denotes an actual bandwidth utilization rate of the i-th server node.

Further, the system further includes:

a server node removal unit configured to, when the determination strategy does not allow network access across internet service operators, remove the server nodes from sorted server nodes different from the internet service operator of the detection node; and a remaining node filtering unit, configured to filter out top N server nodes from the remaining server nodes, and determine the top N server nodes as the best coverage nodes corresponding to the detection node, where N is the number of server nodes corresponding to each detection node in the determination strategy.

Further, the pre-set DNS server includes:

a local DNS address acquisition unit, configured to acquire the IP address of the local DNS server from the domain name resolution request;

a location determination unit, configured to determine a geographic location and an internet service operator of the local DNS server based on the IP address of the local DNS server; and a target record query unit, configured to query a target record that matches the geographic location and internet service operator of the local DNS server from the domain name resolution record, and use the IP address in the target record as the address of the target server node.

The beneficial effects provided by embodiments of the present disclosure are as follows. By establishing a widespread detection network to detect the ungrouped server nodes, the present disclosure uses the data obtained from detection to perform filtering and dynamic grouping, and establish the best coverage table. According to the technical solution of the present disclosure, the configuration administrators may only need to create a simple initial configuration table for domain names, and may not need to create huge and complex coverage table based on different internet service operators and different geographic locations. In addition, the present disclosure may eliminate the limitation on the IP addresses of server nodes and internet service operators, use factors such as the response time and the resource utilization rate as reference, and under situations where the service quality is reliable, further allows different internet service operators to perform network access via the determination strategy. Further, the present disclosure may, based on a preset cycle, automatically adjust the coverage table, such that the coverage table may gradually reach a best status in practical applications. Further, such process requires no experienced operation and maintenance personnel, thus reducing the operation and maintenance cost.

BRIEF DESCRIPTION OF THE DRAWINGS

To more clearly illustrate the technical solution in the present disclosure, the accompanying drawings need to be used in the description of the disclosed embodiments are briefly described hereinafter. Obviously, the drawings described below are merely some embodiments of the present disclosure. Other drawings derived from such drawings may be obtained by a person having ordinary skill in the art without creative labor.

DETAILED DESCRIPTION

To make the objectives, technical solutions and advantages of the present disclosure clearer, embodiments of the present disclosure will be made in detail with reference to the accompanying drawings hereinafter.

Embodiment 1

Figure 1:
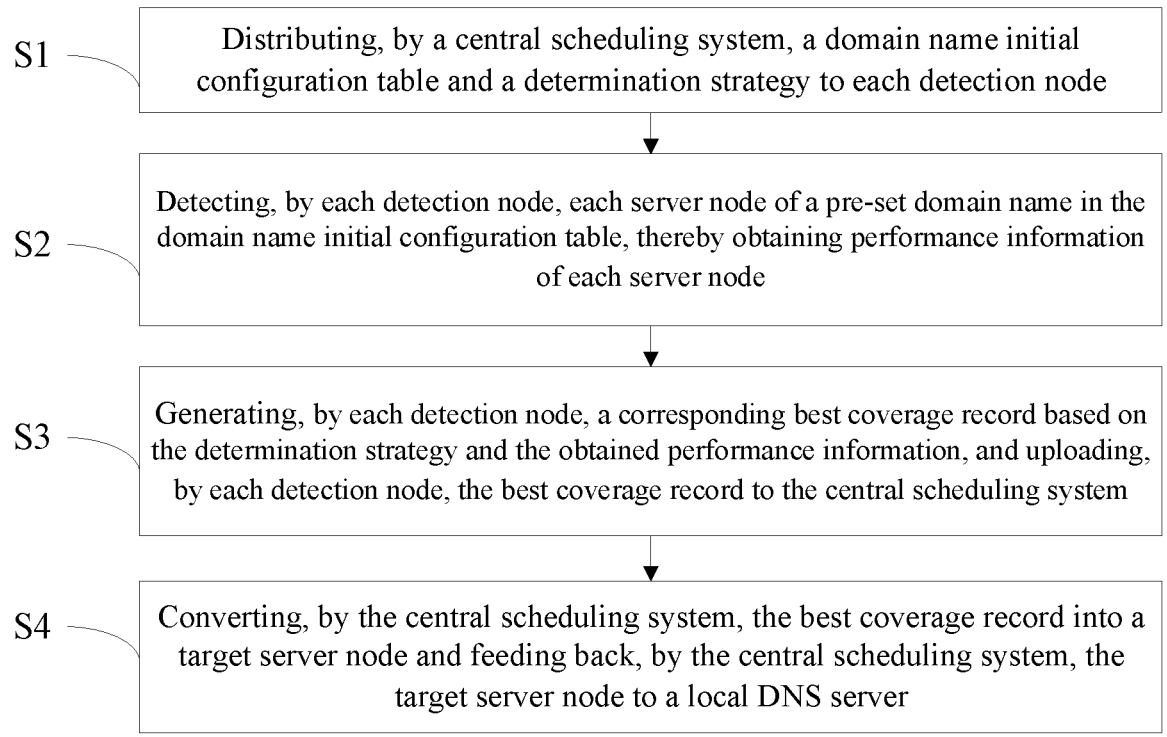
FIG. 1 is a flow chart of a method for dynamic scheduling and allocation of network traffic according to Embodiment 1 of the present disclosure.

Referring to FIG. 1, the present disclosure provides a method for dynamic scheduling and allocation of network traffic. The method may include the following steps.

Step S1: distributing, by a central scheduling system, a domain name initial configuration table and a determination strategy to each detection node.

In one embodiment, the domain name initial configuration table may be pre-set by a configuration administrator in a server of the central scheduling system. The domain name initial configuration table may include a pre-set domain name and IP addresses of a plurality of server nodes that the pre-set domain name directed to.

In one embodiment, the domain name www.test.com may be assumed to have three server nodes. The information of the three server nodes may be shown in Table 1.

TABLE 1

| Server node information | | | |
|---|---|---|---|
| ISP | Geographical location | Serve node IP address | Server room egress bandwidth |
| China Unicom | Fujian | 1.1.1.1 | 100 Mbps |
| China Telecom | Beijing | 2.2.2.1 | 1 Gbps |
| China Mobile | Shanghai | 3.3.3.3 | 2 Gbps |

As shown in Table 1, the three server nodes of the pre-set domain name may correspond to different internet service operators (ISP) and different geographical locations. As such, in one embodiment, based on the aforementioned server node information, a domain name initial configuration table may be generated, as shown in Table 2.

TABLE 2

| Domain name initial configuration table | |
| --- | --- |
| Pre-set domain name | IP address of server node |
| www.test.com | 1.1.1.1; 2.2.2.1; 3.3.3.3 |

The aforementioned pre-set domain name may correspond to IP addresses of three server nodes.

In one embodiment, the configuration administrator may further customize a corresponding determination strategy in the server. The determination strategy may include the number of server nodes corresponding to each detection node, whether network access across internet service operators is allowed, detection time interval, an expected bandwidth utilization rate of the server nodes, and expected response time of the server nodes. For example, the determination strategy may be illustrated as follows:

1. Detection is performed every three minutes;
2. The number of server nodes corresponding to each detection node is 1;
3. Network access across service providers is allowed;
4. The expected bandwidth utilization rate of the server node is 80%; and
5. The expected response time is 100 ms.

After receiving the above-described configuration, the server of the central scheduling system may synchronize the domain name initial configuration table and the determination strategy to all detection nodes through a reliable data transmission channel.

In one embodiment, the number of detection nodes may be assumed to be seven, and the information of the seven detection nodes is shown in Table 3:

TABLE 3

| Detection node information table | | | |
| --- | --- | --- | --- |
| Detection node name | IP address | ISP | Geographical location |
| fjlt_node1 | 100.1.1.1 | China Unicom | Fujian province |
| bjdx_node1 | 110.1.1.1 | China Telecom | Guangdong province |
| ahdx_node1 | 120.1.1.1 | China Telecom | Anhui province |
| shdx_node1 | 130.1.1.1 | China Telecom | Shanghai |
| zjdx_node1 | 140.1.1.1 | China Telecom | Zhejiang province |
| shyd_node1 | 150.1.1.1 | China Mobile | Shanghai |
| bjlt_node1 | 160.1.1.1 | China Unicom | Beijing |

In Table 3, each detection node may receive the domain name initial configuration table and the determination strategy sent from the central scheduling system.

Step S2: for a pre-set domain name in the domain name initial configuration table, detecting, by each detection node, each server node of the pre-set domain name, thereby obtaining performance information of each server node.

Step S3: generating, by each detection node, a corresponding best coverage record based on the determination strategy and the obtained performance information, and uploading, by each detection node, the best coverage record to the central scheduling system.

In one embodiment, after receiving the domain name initial configuration table and the determination strategy, each detection node may automatically enter a best coverage table generation process. Specifically, a detection node fjlt_node1 may be used as an example for illustration.

After receiving the domain name initial configuration table and the determination strategy, fjlt_node1 may detect the IP addresses (1.1.1.1, 2.2.2.1, 3.3.3.3) of server nodes. At this point, each server node may be assumed to have enabled SNMP or opened a bandwidth query interface, thus allowing the detection node to perform normal detection. The detected performance information may include actual response time, actual availability, and actual bandwidth utilization rate of each server node. The actual availability may be represented by 1 or 0, where 1 indicates available, and 0 indicates unavailable. After the detection node completes detection, a detection condition table may be formed, as shown in Table 4.

TABLE 4

| Detection condition table | | | |
| --- | --- | --- | --- |
| Server node | Actual response time | Actual availability | Actual bandwidth utilization rate |
| 1.1.1.1 | 60 ms | 1 | 40% |
| 2.2.2.1 | 100 ms | 1 | 60% |
| 3.3.3.3 | 180 ms | 1 | 70% |

Figure 2:
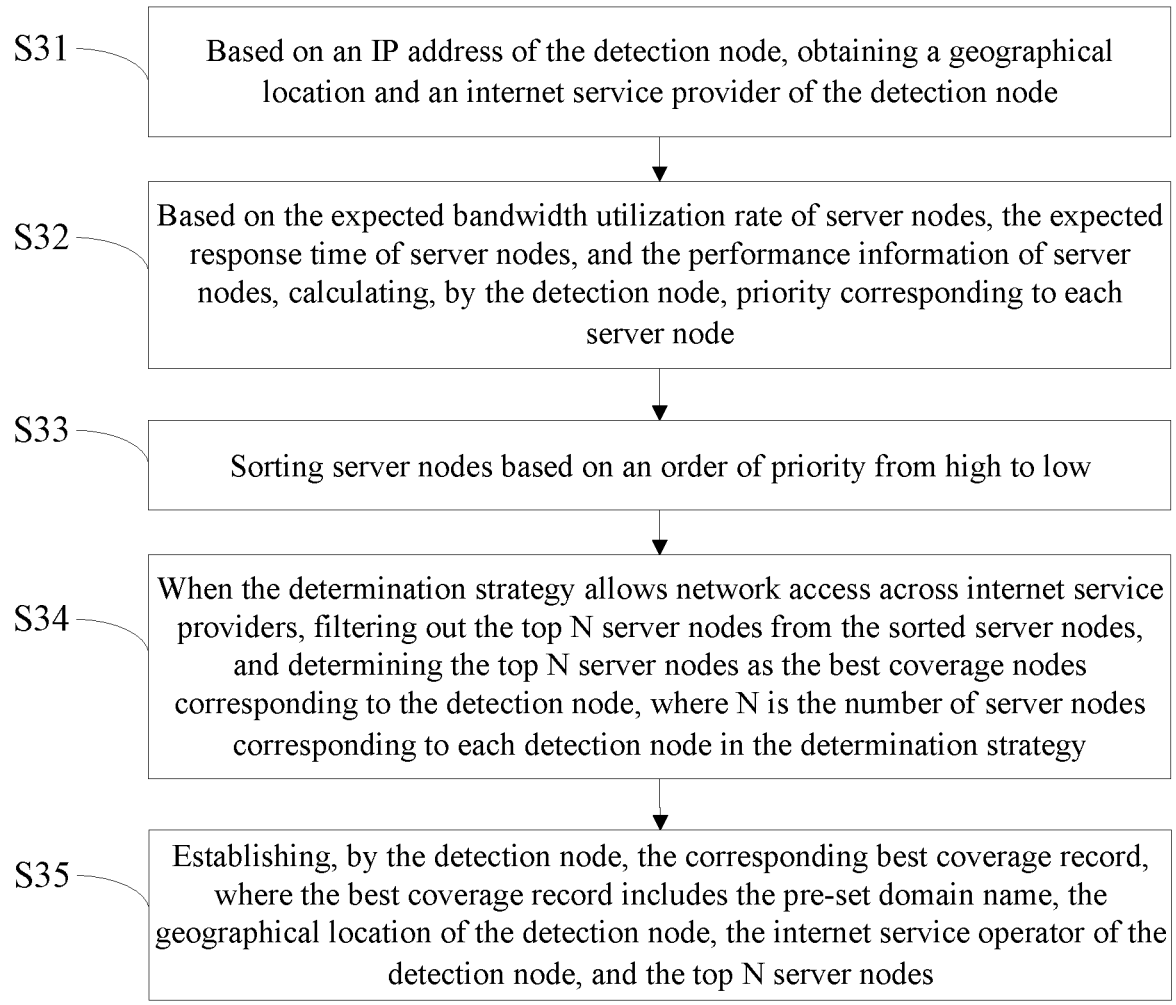
FIG. 2 is a flow chart of generating a best coverage record according to Embodiment 1 of the present disclosure.

In one embodiment, the detection node may integrate the determination strategy and the performance information to generate a best coverage record. Specifically, referring to FIG. 2, steps of generating the best coverage record may include:

Step S31: based on an IP address of the detection node, obtaining a geographical location and an internet service operator of the detection node.

Given fjlt_node1 as an example, based on the corresponding IP address of 100.1.1.1, the ISP of fjlt_node1 may be determined to be China Unicom and the geographical location of fjlt_node1 may be determined to be Fujian province from the detection node information table.

Step S32: based on the expected bandwidth utilization rate of server nodes, the expected response time of server nodes, and the performance information of server nodes, calculating, by the detection node, priority corresponding to each server node.

In one embodiment, the following equation may be used to calculate the priority corresponding to each server node:

$$P_i = (T_s/T_i) * A_i * (B_s/B_i),$$

where, $P_i$ denotes priority corresponding to an i-th server node, $T_s$ denotes the expected response time of the server node in the determination strategy, $T_i$ denotes the actual response time of the i-th server node, $A_i$ denotes the actual availability of the i-th server node (if available, $A_i$ is 1; if unavailable, $A_i$ is 0), $B_s$ denotes the expected bandwidth utilization rate of the server node in the determination strategy, and $B_i$ denotes the actual bandwidth utilization rate of the i-th server node.

As such, for the server node 1.1.1.1, the priority may be (100 ms/60 ms)*1*(80%/40%)=3.3. For the server node 2.2.2.1, the priority may be (100 ms/100 ms)*1* (80%/60%)=1.3. For the server node 3.3.3.3, the priority may be (100 ms/180 ms)*1*(80%/70%)=0.63.

Step S33: sorting server nodes based on an order of priority from high to low.

Step S34: when the determination strategy allows network access across internet service operators, filtering out the top N server nodes from the sorted server nodes, and determining the top N server nodes as the best coverage nodes corresponding to the detection node, where N is the number of server nodes corresponding to each detection node in the determination strategy.

Step S35: establishing, by the detection node, the corresponding best coverage record, where the best coverage record includes the pre-set domain name, the geographical location of the detection node, the internet service operator of the detection node, and the top N server nodes.

In one embodiment, based on parameters such as "the number of server nodes corresponding to each detection node is 1" and "across internet service operators is allowed" that are designated in the determination strategy, the server node with an IP address of 1.1.1.1 may be determined to have the highest priority. Thus, the best coverage record corresponding to the detection node may be selected, as shown in Table 5.

TABLE 5

Best coverage record

| Pre-set domain name | ISP | Geographic location | Server node |
|---|---|---|---|
| www.test.com | China Unicom | Fujian province | 1.1.1.1 |

Similarly, each detection node may generate and upload a best coverage record to the central scheduling system. Finally, the central scheduling system may summarize the best coverage records of the pre-set domain name www.test.com, as shown in Table 6.

TABLE 6

Summary table of best coverage records

| Domain name | ISP | Geographic location | IP address of server node |
|---|---|---|---|
| www.test.com | China Telecom | Fujian province | 1.1.1.1 |
| www.test.com | China Telecom | Guangdong province | 1.1.1.1 |
| www.test.com | China Telecom | Anhui province | 2.2.2.1 |
| www.test.com | China Telecom | Shanghai | 2.2.2.1 |
| www.test.com | China Telecom | Zhejiang province | 1.1.1.1 |
| www.test.com | China Mobile | Shanghai | 3.3.3.3 |
| www.test.com | China Unicom | Beijing | 2.2.2.1 |

It should be noted that, when the determination strategy does not allow network access across internet service operators, the server nodes that do not belong to the same internet service operator as the detection node may be removed from the sorted server nodes. The first N server nodes may be selected from the remaining server nodes, and the first N server nodes may be determined as the best coverage nodes corresponding to the detection node, where N is the number of server nodes corresponding to each detection node in the determination strategy.

Step S4: converting, by the central scheduling system, the best coverage record into a target server node and feeding back, by the central scheduling system, the target server node to a local DNS server.

Specifically, in one embodiment, the central scheduling system may convert each best coverage record into a domain name resolution record, and push the domain name resolution record to a pre-set DNS server.

In one embodiment, the best coverage records often may not be recognized by the DNS server. Thus, the central scheduling system may convert the best coverage record into a domain name resolution record that can be recognized by the DNS server. The domain name resolution records may be pushed to the pre-set DNS server in the central scheduling system, thus enabling the subsequent traffic scheduling process.

In addition, the pre-set DNS server may receive the domain name resolution request sent from the local DNS server, determine an address of the target server node corresponding to the domain name resolution request based on the domain name resolution record, and feedback the address of the target server node to the local DNS server.

In one embodiment, when a user visits the pre-set domain name, the domain name may be sent to the local DNS server. When receiving a domain name sent from a user, the local DNS server may send a domain name resolution request to the pre-set DNS server, thereby determining the IP address of the best server node corresponding to the pre-set domain name.

Figure 3:
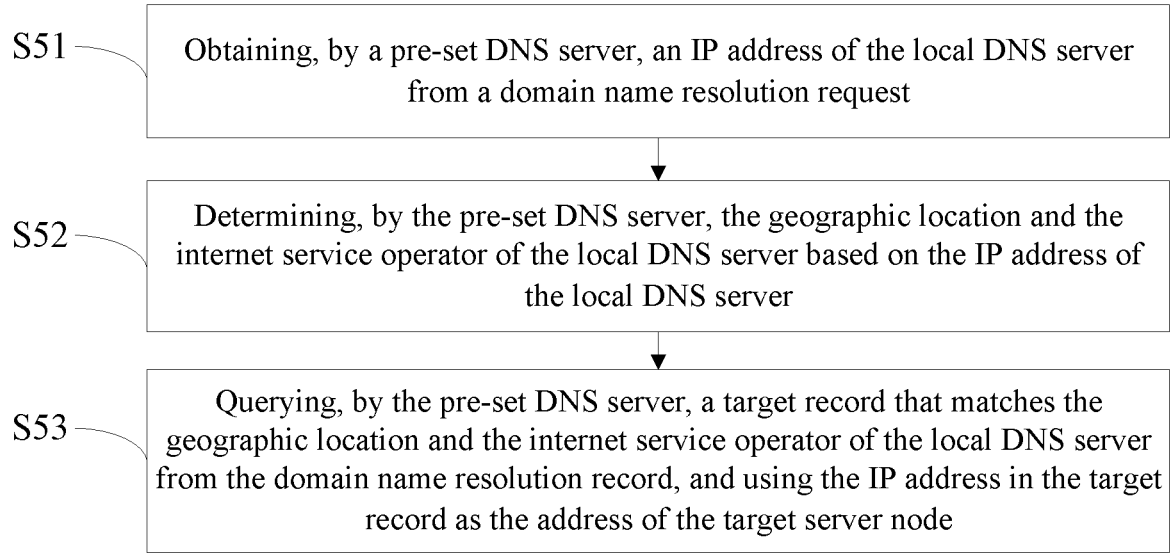
FIG. 3 is a flow chart of a method for determining a target service node address according to Embodiment 1 of the present disclosure.

Specifically, referring to FIG. 3, in one embodiment, the following steps may be used to determine the address of the target server node.

Step S51: obtaining, by a pre-set DNS server, an IP address of the local DNS server from the domain name resolution request.

Step S52: determining, by the pre-set DNS server, the geographic location and the internet service operator of the local DNS server based on the IP address of the local DNS server.

Step S53: querying, by the pre-set DNS server, a target record that matches the geographic location and the internet service operator of the local DNS server from the domain name resolution record, and using the IP address in the target record as the address of the target server node.

For example, the geographic location of the local DNS server may be Guangdong province, and the internet service operator of the local DNS server may be China Telecom. Based on such information, Table 6 shows that the corresponding best server node has an IP address of 1.1.1.1, and the IP address of 1.1.1.1 may be used as the address of the target server node. When a target resource is visited through the sever node, the user may have a relatively smooth network experience.

In one embodiment, each detection node may generate a corresponding best coverage record, and upload the best coverage record to the central scheduling system. The central scheduling system may refresh the initial configuration table based on the received best coverage record. The central scheduling system may recognize target server node by using the refreshed configuration table. Specifically, in the central scheduling system, the initial configuration table may be deleted, the best coverage record may be written under the path of the initial configuration table, and the initial configuration table may be refreshed using the best coverage record.

In one embodiment, after the detection nodes generate the best coverage record and uploads the best coverage record to the central scheduling system, each detection node may once again obtain the performance information of each server node according to the detection time interval in the determination strategy. Then, each detection node may re-generate the corresponding best coverage record based on the once again obtained performance information and the determination strategy, and may upload the re-generated best coverage record to the central scheduling system. As such, the central scheduling system may refresh the best coverage record stored locally based on the re-generated best coverage record.

Accordingly, by self-adjusting the best coverage record periodically, the scheduling may be more precise, thereby allowing the traffic to more likely flow towards spare server nodes that have good response quality. Thus, the utilization rate of the server node may be ensured, the service access speed may be improved, and the cost of operation and maintenance may be reduced.

Embodiment 2

Figure 4:
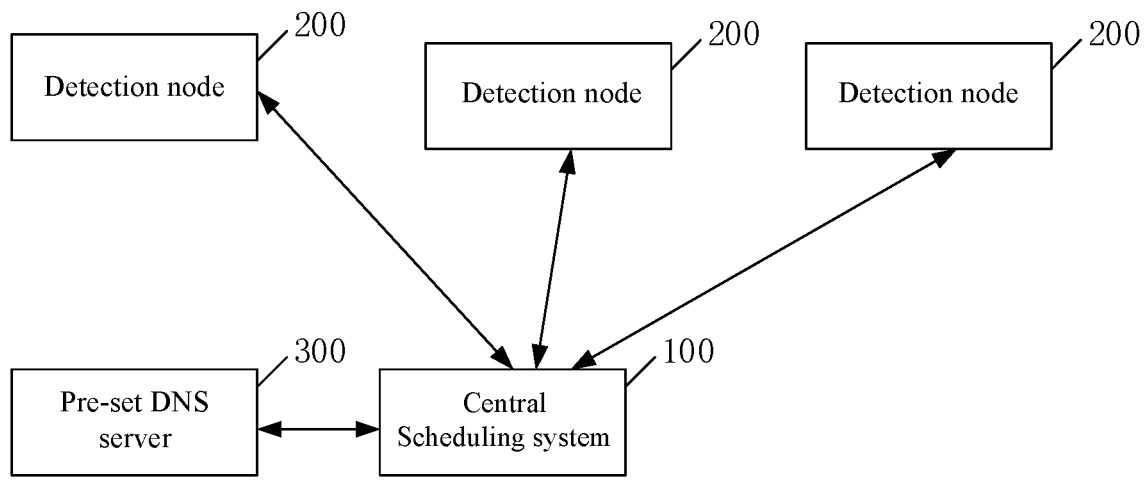
FIG. 4 is a structural schematic view of a system for dynamic scheduling and allocation of network traffic according to Embodiment 2 of the present disclosure.

Referring to FIG. 4, the present disclosure further provides a system for dynamic scheduling and allocation of network traffic. The system may include a central scheduling system 100, at least one detection node 200, and a pre-set DNS server 300.

The central scheduling system 100 may be used to distribute a domain name initial configuration table and a determination strategy to each detection node and receive the best coverage record uploaded by each detection node. The central scheduling system 100 may convert the best coverage records into domain name resolution records, and push the domain name resolution records to a pre-set DNS server.

Each detection node 200 may be used to, with respect to the pre-set domain name in the domain name initial configuration table, initiate detection on each server node of the pre-set domain name, thereby obtaining performance information of each server node. Based on the determination strategy and the obtained performance information, each detection node 200 may generate a best coverage record, and upload the best coverage record to the central scheduling system.

The pre-set DNS server 300 may be used to receive a domain name resolution request sent from a local DNS server, determine an address of the target server node corresponding to the domain name resolution request based on the domain name resolution record, and feedback the address of the target server node to the local DNS server.

In one embodiment, the determination strategy may include the number of server nodes corresponding to each detection node, whether network access across internet service operators is allowed, detection time interval, the expected bandwidth utilization rate of the server nodes, and the expected response time of the server nodes. The performance information of each server node includes actual response time, actual availability, and actual bandwidth utilization rate of each server node.

In one embodiment, each detection node 200 may include:

a location information acquisition unit, configured to acquire a geographic location and an internet service operator of each detection node based on a corresponding IP address;

a priority calculation unit, configured to calculate priority corresponding to each server node based on the expected bandwidth utilization rate of the server node, the expected response time of the server node, and the performance information of the server node;

a sorting unit, configured to sort the server nodes based on an order of the priority from high to low;

a server node filtering unit configured to, when the determination strategy allows network access across internet service operators, filter out the top N server nodes from the sorted server nodes and determine the top N server nodes as the best coverage nodes, where N is the number of server nodes corresponding to each detection node in the determination strategy; and a coverage record establishment unit, configured to establish the best coverage record, where the best coverage record includes a pre-set domain name, a geographic location and an internet service operator of the detection node, and N server nodes.

In one embodiment, the following equation may be used to calculate the priority corresponding to each server node:

$$P_i=(T_s/T_i)*A_i*(B_s/B_i),$$

where, $P_i$ denotes priority corresponding to an i-th server node, $T_s$ denotes the expected response time of the server node in the determination strategy, $T_i$ denotes the actual response time of the i-th server node, $A_i$ denotes the actual availability of the i-th server node (if available, $A_i$ is 1; if unavailable, $A_i$ is 0), $B_s$ denotes the expected bandwidth utilization rate of the server node in the determination strategy, and $B_i$ denotes the actual bandwidth utilization rate of the i-th server node.

In one embodiment, the system may further include:

a server node removal unit configured to, when the determination strategy does not allow network access across internet service operators, remove the server nodes that belong to internet service operators different from the internet service operator that the detection node belongs to from the sorted server nodes; and a remaining node filtering unit, configured to filter out the top N server nodes from the remaining server nodes, and determine the top N server nodes as the best coverage nodes corresponding to the detection node, where N is the number of server nodes corresponding to each detection node in the determination strategy.

In one embodiment, the pre-set DNS server may include:

a local DNS address acquisition unit, configured to acquire the IP address of the local DNS server from the domain name resolution request;

a location determination unit, configured to determine a geographic location and an internet service operator of the local DNS server based on the IP address of the local DNS server; and a target record query unit, configured to query a target record that matches the geographic location and internet service operator of the local DNS server from the domain name resolution record, and use the IP address in the target record as the address of the target server node.

The beneficial effects provided by embodiments of the present disclosure are as follows. By establishing a widespread detection network to detect the ungrouped server nodes, the present disclosure uses the data obtained from detection to perform filtering and dynamic grouping, and establish the best coverage table. According to the technical solution of the present disclosure, the configuration administrators may only need to create a simple initial configuration table for domain names, and may not need to create huge and complex coverage table based on different internet service operators and different geographic locations. In addition, the present disclosure may eliminate the limitation on the IP addresses of server nodes and internet service operators, and use factors such as the response time and the resource utilization rate as reference, and under situations where the service quality is reliable, further allows different internet service operators to perform network access via the determination strategy. Further, the present disclosure may, based on a preset cycle, automatically adjust the coverage table, such that the coverage table may gradually reach a best status in practical applications. Further, such process requires no experienced operation and maintenance personnel, thus reducing the operation and maintenance cost.

The sequence of the embodiments described above is merely for illustrative purpose, and does not represent any preference.

The system embodiments described above are merely for illustrative purpose.

The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A method for dynamic scheduling and allocation of network traffic, comprising:
   distributing, by a central scheduling system, a domain name initial configuration table and a determination strategy to each detection node;
   detecting, by each detection node, each server node of a pre-set domain name in the domain name initial configuration table, thereby obtaining performance information of each server node;
   generating, by each detection node, a corresponding best coverage record based on the determination strategy and the obtained performance information, and uploading, by each detection node, the best coverage record to the central scheduling system; and
   converting, by the central scheduling system, the best coverage record into a target server node address and feeding back, by the central scheduling system, the target server node address to a local DNS server.

2. The method for dynamic scheduling and allocation of network traffic according to claim 1, wherein:
   the determination strategy includes a total number of server nodes corresponding to each detection node, whether network access across internet service operators is allowed, detection time interval, an expected bandwidth utilization rate of each server node, and expected response time of each server node; and
   the performance information of each server node includes actual response time, actual availability, and an actual bandwidth utilization rate of each server node.

3. The method for dynamic scheduling and allocation of network traffic according to claim 2, wherein generating, by each detection node, the corresponding best coverage record based on the determination strategy and the obtained performance information includes:
   based on an IP address of each detection node, obtaining a geographical location and an internet service operator of each detection node;
   based on the expected bandwidth utilization rate, the expected response time of the server node, and the performance information of the server node, calculating, by the detection node, a priority corresponding to each server node;
   sorting server nodes based on an order of the priority from high to low;
   when the determination strategy allows network access across internet service operators, filtering out top N server nodes from the sorted server nodes, and determining the top N server nodes as best coverage nodes corresponding to the detection node, wherein N is a number of server nodes corresponding to each detection node in the determination strategy; and
   establishing, by each detection node, a corresponding best coverage record, wherein the best coverage record includes the pre-set domain name, the geographical location of the detection node, the internet service operator of the detection node, and the top N server nodes.

4. The method for dynamic scheduling and allocation of network traffic according to claim 3, wherein an equation below is used to calculate the priority corresponding to each server node:

$$P_i = (T_s/T_i) * A_i * (B_s/B_i),$$

wherein $P_i$ denotes a priority corresponding to an i-th server node, $T_s$ denotes an expected response time of the server node in the determination strategy, $T_i$ denotes an actual response time of the i-th server node, $A_i$ denotes an actual availability of the i-th server node, when the i-th server node is available, $A_i$ is 1; when the i-th server node is unavailable, $A_i$ is 0, $B_s$ denotes an expected bandwidth utilization rate of the server node in the determination strategy, and $B_i$ denotes an actual bandwidth utilization rate of the i-th server node.

5. The method for dynamic scheduling and allocation of network traffic according to claim 3, further including:
   when the determination strategy does not allow network access across internet service operators, removing server nodes from sorted server nodes different from the internet service operator of the detection node; and
   filtering out top N server nodes from remaining server nodes, and determining the top N server nodes as best coverage nodes corresponding to the detection node, wherein N is the number of server nodes corresponding to each detection node in the determination strategy.

6. The method for dynamic scheduling and allocation of network traffic according to claim 1, further including:
   determining the target server node address corresponding to a domain name resolution request based on a domain name resolution record, by:
      obtaining, by a pre-set DNS server, an IP address of the local DNS server from the domain name resolution request;
      determining, by the pre-set DNS server, a geographic location and an internet service operator of the local DNS server based on the IP address of the local DNS server; and querying, by the pre-set DNS server, a target record that matches the geographic location and the internet service operator of the local DNS server from the domain name resolution record, and using an IP address in the target record as the target server node address.

7. The method for dynamic scheduling and allocation of network traffic according to claim 1, wherein after uploading, by each detection node, the best coverage record to the central scheduling system, the method further includes:
obtaining once again, by each detection node, the performance information of each server node according to the detection time interval in the determination strategy; and
re-generating, by each detection node, a corresponding best coverage record based on the once again obtained performance information and the determination strategy, and uploading, by each detection node, the re-generated best coverage record to the central scheduling system.

8. The method for dynamic scheduling and allocation of network traffic according to claim 1, wherein generating, by each detection node, the corresponding best coverage record, and uploading, by each detection node, the best coverage record to the central scheduling system further includes:
refreshing, by the central scheduling system, the initial configuration table based on the best coverage record, and recognizing, by the central scheduling system, the target server node address based on the refreshed configuration table.

9. The method for dynamic scheduling and allocation of network traffic according to claim 1, wherein converting, by the central scheduling system, the best coverage record into the target server node address and feeding back, by the central scheduling system, the target server node address to the local DNS server includes:
converting, by the central scheduling system, each best coverage record into a domain name resolution record, and pushing the domain name resolution record to a pre-set DNS server; and
receiving, by the pre-set DNS server, a domain name resolution request sent from the local DNS server, determining, by the pre-set DNS server, target server node address corresponding to the domain name resolution request based on the domain name resolution record, and feeding back, by the pre-set DNS server, target server node address to the local DNS server.

10. A system for dynamic scheduling and allocation of network traffic, comprising:
a central scheduling system, at least one detection node, and a pre-set DNS server, wherein:
the central scheduling system is configured to distribute a domain name initial configuration table and a determination strategy to each detection node, receive a best coverage record uploaded by each detection node, convert each best coverage record into a domain name resolution record, and push the domain name resolution record to the pre-set DNS server;
each detection node is configured to, with respect to a pre-set domain name in the domain name initial configuration table, initiate detection on each server node of the pre-set domain name, thereby obtaining performance information of each server node; generate a corresponding best coverage record based on the determination strategy and the obtained performance information, and upload the best coverage record to the central scheduling system; and
the pre-set DNS server is configured to receive a domain name resolution request sent from the local DNS server, determine a target server node address corresponding to the domain name resolution request based on the domain name resolution record, and feedback the target server node address to the local DNS server.

11. The system for dynamic scheduling and allocation of network traffic according to claim 10, wherein:
the determination strategy includes a total number of server nodes corresponding to each detection node, whether network access across internet service operators is allowed, detection time interval, an expected bandwidth utilization rate of each server node, and expected response time of each server node; and
the performance information of each server node includes actual response time, actual availability, and an actual bandwidth utilization rate of each server node.

12. The system for dynamic scheduling and allocation of network traffic according to claim 11, wherein each detection node includes:
a location information acquisition unit, configured to acquire a geographic location and an internet service operator of each detection node based on a corresponding IP address;
a priority calculation unit, configured to calculate a priority corresponding to each server node based on the expected bandwidth utilization rate of the server node, the expected response time of the server node, and the performance information of the server node;
a sorting unit, configured to sort server nodes based on an order of the priority from high to low;
a server node filtering unit configured to, when the determination strategy allows network access across internet service operators, filter out top N server nodes from the sorted server nodes and determine the top N server nodes as best coverage nodes, wherein N is a number of server nodes corresponding to each detection node in the determination strategy; and
a coverage record establishment unit, configured to establish a best coverage record, wherein the best coverage record includes the pre-set domain name, the geographic location and the internet service operator of the detection node, and the top N server nodes.

13. The system for dynamic scheduling and allocation of network traffic according to claim 12, wherein an equation below is used to calculate priority corresponding to each server node:

$$P_i=(T_s/T_i)*A_i*(B_s/B_i),$$

wherein $P_i$ denotes a priority corresponding to an i-th server node, $T_s$ denotes an expected response time of the server node in the determination strategy, $T_i$ denotes an actual response time of the i-th server node, $A_i$ denotes an actual availability of the t-th server node, when the i-th server node is available, $A_i$ is 1; when the i-th server node is unavailable, $A_i$ is 0, $B_s$ denotes an expected bandwidth utilization rate of the server node in the determination strategy, and $B_i$ denotes an actual bandwidth utilization rate of the i-th server node.

14. The system for dynamic scheduling and allocation of network traffic according to claim 12, further including:
a server node removal unit configured to, when the determination strategy does not allow network access across internet service operators, remove server nodes from sorted server nodes different from the internet service operator of the detection node; and a remaining node filtering unit, configured to filter out top N server nodes from remaining server nodes, and determine the top N server nodes as best coverage nodes corresponding to the detection node, wherein N is the number of server nodes corresponding to each detection node in the determination strategy.

15. The system for dynamic scheduling and allocation of network traffic according to claim 10, wherein the pre-set DNS server includes:

a local DNS address acquisition unit, configured to acquire an IP address of the local DNS server from the domain name resolution request;

a location determination unit, configured to determine a geographic location and an internet service operator of the local DNS server based on the IP address of the local DNS server, and a target record query unit, configured to query a target record that matches the geographic location and internet service operator of the local DNS server from the domain name resolution record, and use an IP address in the target record as the target server node address.

16. The system for dynamic scheduling and allocation of network traffic according to claim 10, wherein each detection node is configured to upload the best coverage record to the central scheduling system by:

obtaining once again, by each detection node, the performance information of each server node according to the detection time interval in the determination strategy; and re-generating, by each detection node, a corresponding best coverage record based on the once again obtained performance information and the determination strategy, and uploading, by each detection node, the re-generated best coverage record to the central scheduling system.

17. The method for dynamic scheduling and allocation of network traffic according to claim 10, wherein each detection node is further configured to:

refresh the initial configuration table based on the best coverage record, and recognize the target server node address based on the refreshed configuration table.

* * * * *